Sept. 23, 1930.    F. W. WATERMAN, JR    1,776,461
HUMIDIFYING APPARATUS
Filed March 11, 1929    2 Sheets-Sheet 1
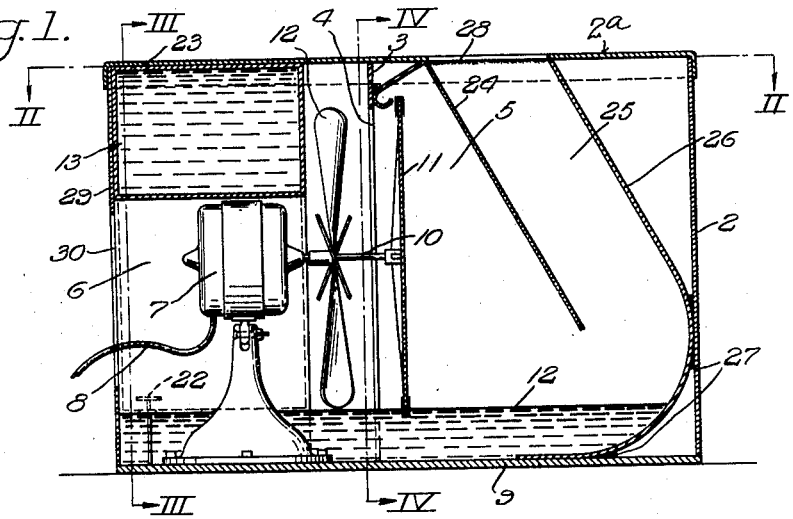
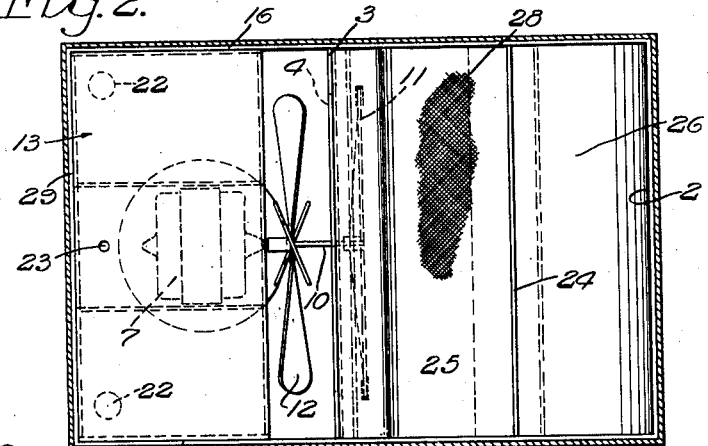
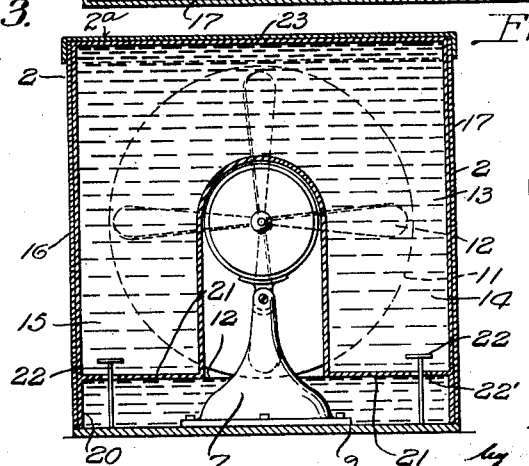
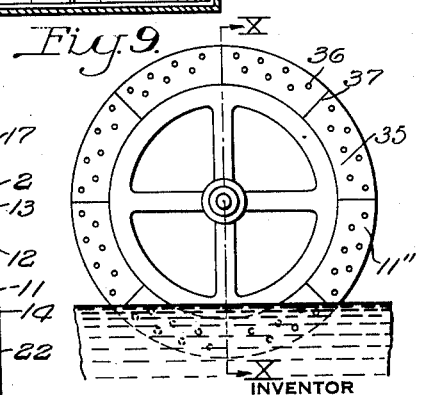
INVENTOR
Fred. W. Waterman Jr.
by Byrnes, Stebbins & Parmelee
his Attys.

Sept. 23, 1930. F. W. WATERMAN, JR 1,776,461
HUMIDIFYING APPARATUS
Filed March 11, 1929 2 Sheets-Sheet 2
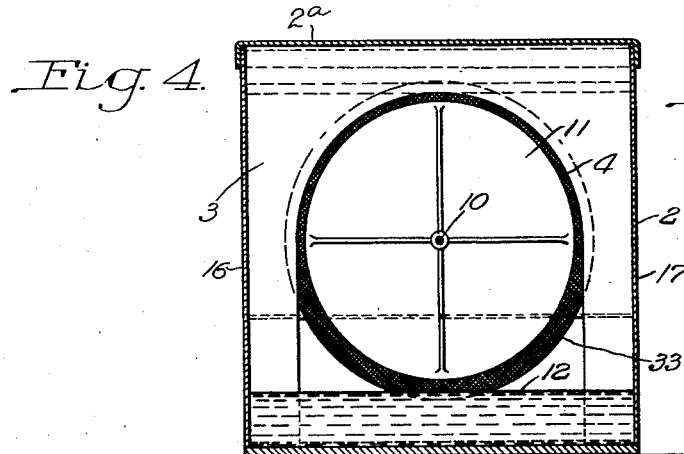
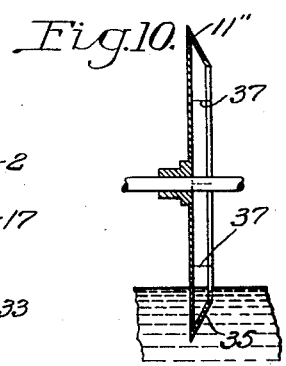
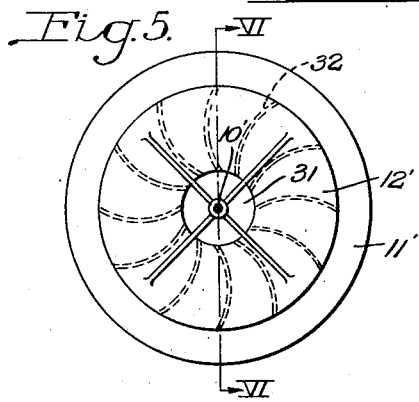
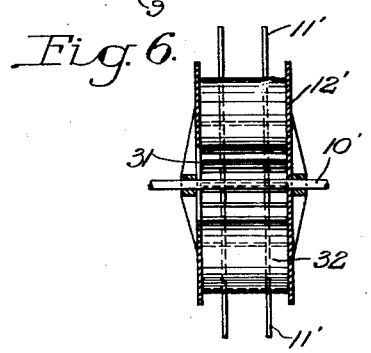
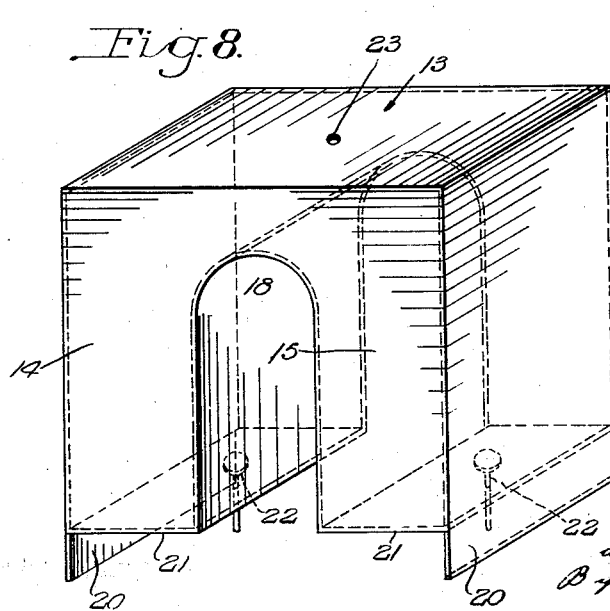
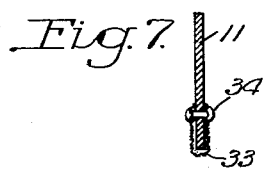
INVENTOR Patented Sept. 23, 1930

1,776,461

UNITED STATES PATENT OFFICE

FRED W. WATERMAN, JR., OF JOHNSTOWN, PENNSYLVANIA, ASSIGNOR TO NATIONAL RADIATOR CORPORATION, OF JOHNSTOWN, PENNSYLVANIA, A CORPORATION OF DELAWARE

HUMIDIFYING APPARATUS

Application filed March 11, 1929. Serial No. 345,908.

My invention relates to humidifying apparatus, and particularly to humidifiers which can be economically produced and which are adapted for use in raising the humidity of the air in homes, offices, apartments and small manufacturing plants where large humidifying systems could not advantageously be installed.

My invention provides a humidifier in which water is maintained substantially at a constant level in a casing. A rotatable means, such as a disc, is mounted within the casing on a shaft having its axis extending substantially horizontal to the surface of the water in the casing. On the shaft is also arranged a fan or other means for propelling air. As the disc rotates it picks up and throws off water, and the particles of water are projected by the air against a baffle and led through a tortuous or winding passage to the outlet of the humidifier. The baffles and tortuous passage prevents any large particles of water from being delivered from the humidifier. In order to further insure against any large particles being delivered from the humidifier, a screen is arranged over its outlet.

In the accompanying drawings which illustrate several preferred embodiments of my invention, Figure 1 is a vertical section of the humidifier, Figure 2 is a horizontal section taken on the line II—II of Figure 1, Figure 3 is a vertical section on the line III—III of Figure 1, Figure 4 is a section on the line IV—IV of Figure 1, Figure 5 is a side elevation of a rotary blower type fan having discs connected thereto, Figure 6 is a section on the line VI—VI of Figure 5, Figure 7 is a detail showing the disc having a wire screen secured to its periphery, Figure 8 is a perspective view of the water container, Figure 9 illustrates another modified form of disc, and Figure 10 is a section on the line X—X of Figure 9.

Referring to the drawings, there is shown a casing 2 generally rectangular in shape and having a removable lid 2ª. The casing is divided by a partition 3, having an opening 4 in its center, into a mixing chamber 5 and an air chamber 6. A motor 7, having electrical connections 8, is secured to the bottom 9 of the casing 2 in the air chamber 6. A substantially horizontal shaft 10 connected to the motor has a disc 11 and a propeller fan 12 secured thereto. The disc 11 is mounted so that it rotates in a plane substantially at right angles to the surface of the water 12 in the bottom of the casing.

A water tank, indicated generally by the numeral 13, is arranged in the air chamber 6. The water tank is of a general U shape having the legs 14 and 15 arranged adjacent the sides 16 and 17 of the casing 2.

As shown more in detail in Figure 8, the space 18 between the legs 14 and 15 is provided so that the water tank 13 fits over the motor 7 when the tank is arranged in the casing 2. The bottoms of the legs 14 and 15 are extended to form flanges 20, which rest on the bottom of the casing 2 and support the water tank. The bottoms 21 of the legs 14 and 15 are provided with valves 22, which ordinarily prevent water in the tank from flowing therefrom. An opening 23 is provided in the top of the tank for filling it when necessary. The opening may be closed by a plug (not shown) which seals the tank 13.

The mixing chamber 5 has a baffle 24 arranged therein and adapted to form one side of a tortuous passage 25 for directing the moist air through the humidifying apparatus. The opposite side of the passage 25 is defined by a plate 26 curved as illustrated in Figure 1 to present the least wind resistance and is connected by welding 27 to the end and bottom of the tank. The outlet passage 28 of the humidifier is covered by a wire screen in order to present any large particles of water from being delivered from the humidifier.

The water tank 13 is filled through the opening 23 and a closure is inserted therein. The valves 22 are held in closed position by the weight of the water above them. The water tank 13 is then set into the humidifying apparatus and as it is lowered into position the flanges 20 contact with the bottom of the casing 2. Since the stems of the valves 22 are longer than the depth of the flanges 20, the valves are raised so as to allow water to flow from the water tank into the casing 2. The water continues to flow from the water tank until it is on a level with the openings 22' controlled by the valves 22. During the flow of the water from the tank, air flows in through the openings 22' and displaces the water therein. When the water rises up to the openings 22' no more air can be admitted and the flow of water from the tank therefore stops. When the water in the humidifier lowers, air flows through the openings 22' and automatically re-establishes the desired level in the casing.

The end 29 of the casing 2 has an opening 30 through which air may enter. When the motor is in operation, the fan 12 and disc 11 are rapidly rotated. The disc picks up and sprays water from its periphery due to centrifugal force. The water is thrown off from the disc in the form of a spray which impinges against the baffle 24. At the same time the current of air caused by the fan 12 flows into the mixing chamber 5 and absorbs the small particles of water. Some of the large particles are broken up by impingement against the baffle 24, and are absorbed by the current of air, and other large particles are directed downwardly by the baffle and returned to the water in the bottom of the humidifier. The current of air, moistened by the water particles which it has absorbed, flows in a tortuous manner through the passage 25. Because of the shape of the passage, any large particles which may have passed the bottom of the baffle 24 are prevented from issuing from the humidifier. In order to insure that air laden only with very small particles of moisture is delivered from the humidifier the screen 28 is arranged over the outlet of the passage 25.

The arrangement of the above described apparatus is such that a relatively large quantity of air is mixed with a relatively small amount of water picked up and thrown off from the rotating disc 11. In humidifiers heretofore in use a large amount of water has been mixed with a relatively small amount of air so that the air has become saturated with moisture. The air sometimes is so heavily laden with moisture that drops are deposited upon and injure furniture, or other perishable articles, in the room in which the humidifier is located. This disadvantage is eliminated in my device by the utilization of a relatively large amount of air and a relatively small amount of water, and by the provision of baffles, tortuous passages, and screens arranged over the outlet opening of the humidifier.

In Figures 5 and 6 there is shown a humidifier in which a rotary blower type fan is substituted for the propeller type fan 12 shown in Figures 1 to 4. In Figures 5 and 6 two discs 11' are shown mounted on the outer periphery of the rotary blower 12'. The discs and fan are mounted on a shaft 10' rotated in a manner similar to that described in connection with the embodiment shown in Figures 1 to 4. Upon rotation of the fan, air is drawn in through the opening 31 by the blades 32 and is directed past the discs 11'. The discs throw off a spray of water in the manner previously described to form a mist, and the mist is led through a tortuous passage to the outlet of the humidifier. Whether the propeller type fan 12 or the rotary blower type fan 12' is employed, the discs 11 and 11' may have a wire screen or other means secured to their peripheries in order to increase the amount of water sprayed therefrom upon rotation of the discs. As illustated in detail in Figure 7 a wire screen 33 is riveted at 34 to the disc 11.

In Figures 9 and 10 there is illustrated a disc 11'' with an annular V-shaped periphery which has proved particularly effective in creating a large amount of mist. The periphery of the disc is flanged to form a lip 35. The lip has openings 36 as indicated in Figure 9. The interior of the lip 35 is divided into segments by partitions 37. As the disc is rotated, water flows over the edge of the lip which is submerged and into the interior of the disc. Upon further rotation the disc throws off the water in the form of a fine spray through openings 36. This spray is mixed with air in the manner previously described.

I have illustrated and described several preferred embodiments of my invention. It is to be understood, however, that the invention may be otherwise embodied without departing from the spirit of the invention or the scope of the following claims.

I claim:

1. A humidifier comprising a casing forming a water reservoir, a disc having an annular V-shaped periphery provided with openings communicating with its interior mounted for rotation in a plane substantially vertical to the surface of the water in the reservoir and having its lower edge submerged therein for emitting a spray of water, means for rotating said disc to form a mist, and means for passing a current of air through the mist.

2. A humidifier comprising a casing forming a water reservoir, a disc having an annular V-shaped periphery provided with openings communicating with its interior, the interior of the disc being divided into segments, said disc being mounted for rotation in a plane substantially vertical to the surface of the water in the reservoir and having its lower edge submerged therein for emitting a spray of water, means for rotating said disc to form a mist, and means for passing a current of air through the mist.

3. A humidifier comprising a casing having an inlet and outlet, a substantially U-shaped water tank in the container, the legs of the U extending downwardly, a motor in the space between the legs, and a fan and disc rotatable by the motor, the water tank having an outlet opening for supplying water to the casing.

4. A humidifier comprising a casing having an inlet and outlet, a substantially U-shaped water tank in the container, the legs of the U extending downwardly, a motor in the space between the legs, a fan and disc operably connected to the motor, the water tank having an outlet controlled by a valve for supplying water to the casing, the valve being free to close the outlet when the tank is removed from the casing.

In testimony whereof I have hereunto set my hand.

FRED W. WATERMAN, Jr.